(12) United States Patent
Singh et al.

(10) Patent No.: US 8,363,675 B2
(45) Date of Patent: Jan. 29, 2013

(54) METHOD AND SYSTEM FOR TRANSMISSION OF UNCOMPRESSED VIDEO OVER WIRELESS COMMUNICATION CHANNELS

(75) Inventors: Harkirat Singh, Santa Clara, CA (US); Huai-Rong Shao, San Jose, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1707 days.

(21) Appl. No.: 11/725,668

(22) Filed: Mar. 20, 2007

(65) Prior Publication Data
US 2007/0240191 A1  Oct. 11, 2007

Related U.S. Application Data

(60) Provisional application No. 60/785,771, filed on Mar. 24, 2006.

(51) Int. Cl.
*H04N 9/76* (2006.01)
*H04N 7/18* (2006.01)

(52) U.S. Cl. ................ 370/473; 375/240.12; 725/81

(58) Field of Classification Search .......... 370/328–338, 370/349, 394, 395.1–395.4; 714/701, 704, 714/758, 52, 748, 769, 807; 375/240.01–241; 725/81; 348/600
See application file for complete search history.

(56) References Cited

U.S. PATENT DOCUMENTS

| | | | |
|---|---|---|---|
| 6,161,207 A * | 12/2000 | Lockhart et al. | 714/758 |
| 6,611,537 B1 | 8/2003 | Edens et al. | |
| 6,681,364 B1 | 1/2004 | Calvignac et al. | |
| 6,757,851 B1 | 6/2004 | Park et al. | |
| 7,043,681 B2 | 5/2006 | Kroeger et al. | |
| 7,158,473 B2 | 1/2007 | Kurobe et al. | |
| 7,178,082 B2 | 2/2007 | Yu et al. | |
| 7,315,898 B2 | 1/2008 | Kohno | |
| 7,346,018 B2 | 3/2008 | Holtzman et al. | |
| 7,346,037 B2 | 3/2008 | Yun et al. | |
| 7,355,976 B2 | 4/2008 | Ho et al. | |
| 7,599,363 B2 | 10/2009 | Jang et al. | |
| 7,826,436 B2 | 11/2010 | Niu et al. | |
| 7,881,258 B2 | 2/2011 | Gilbert et al. | |
| 7,889,707 B2 | 2/2011 | Niu et al. | |
| 7,979,784 B2 | 7/2011 | Shao et al. | |

(Continued)

FOREIGN PATENT DOCUMENTS

| | | |
|---|---|---|
| CN | 1196611 A | 10/1998 |
| CN | 1292626 | 4/2001 |

(Continued)

OTHER PUBLICATIONS

Hitachi, Ltd. et al., High-Definition Multimedia Interface (HDMI) Specification Version 1.2, Aug. 22, 2005, pp. 1-214.

(Continued)

*Primary Examiner* — Kamran Afshar
*Assistant Examiner* — Kashif Siddiqui
(74) *Attorney, Agent, or Firm* — Kenneth L. Sherman, Esq.; Michael Zarrabian, Esq.; Sherman & Zarrabian LLP

(57) ABSTRACT

A method and system is provided for transmission of video information pixels over wireless channels, where each video pixel includes a plurality of components and each component comprises video information bits. The information bites are logically grouped into multiple logical groups in a packet, and error detection information is determined for each logical group. The error detection information is placed in the packet, and the packet is transmitted from a transmitter to a receiver over a wireless channel.

89 Claims, 14 Drawing Sheets

U.S. PATENT DOCUMENTS

| | | | |
|---|---|---|---|
| 2004/0086268 | A1 | 5/2004 | Radha et al. |
| 2004/0156354 | A1 | 8/2004 | Wang et al. |
| 2005/0123042 | A1* | 6/2005 | Park .................... 375/240.12 |
| 2006/0034317 | A1 | 2/2006 | Hong et al. |
| 2006/0050695 | A1 | 3/2006 | Wang |
| 2006/0209892 | A1 | 9/2006 | MacMullan et al. |
| 2007/0091999 | A1 | 4/2007 | Nissan-Cohen et al. |
| 2007/0165566 | A1 | 7/2007 | Khan et al. |
| 2007/0189397 | A1 | 8/2007 | Ngo et al. |
| 2007/0234134 | A1* | 10/2007 | Shao et al. .................... 714/701 |
| 2007/0234170 | A1 | 10/2007 | Shao et al. |
| 2007/0245387 | A1 | 10/2007 | Singh et al. |
| 2009/0089842 | A1 | 4/2009 | Perry et al. |
| 2009/0132893 | A1 | 5/2009 | Miyazaki et al. |
| 2009/0138774 | A1 | 5/2009 | Singh et al. |

FOREIGN PATENT DOCUMENTS

| | | |
|---|---|---|
| JP | 53-075818 | 7/1978 |
| JP | 53075818 | 7/1978 |
| JP | 61-041241 | 2/1986 |
| JP | 63-237628 | 10/1988 |
| JP | 04-370583 | 12/1992 |
| JP | 04370583 | 12/1992 |
| JP | 11-055214 | 2/1999 |
| JP | 11-317675 | 11/1999 |
| JP | 2003-008553 | 1/2003 |
| JP | 2004505473 | 2/2004 |
| JP | 2005-341441 | 12/2005 |
| WO | 0002320 | 1/2000 |
| WO | WO 03/094533 A1 | 11/2003 |
| WO | 2004034654 A1 | 4/2004 |
| WO | WO 2005/034521 A1 | 4/2005 |

OTHER PUBLICATIONS

Notification of Transmittal of the International Search Authority, International Search Report and Written Opinion dated Jul. 9, 2007 for International Application No. PCT/KR2007/001528 filed Oct. 4, 2007, pp. 1-8, Korean Intellectual Property Office, Seo-gu, Daejeon, Republic of Korea.

Chinese Office Action dated Mar. 29, 2010 for Chinese Patent Application No. 200780007976.X, pp. 1-4, China Patent Office, People's Republic of China (English-language translation included, pp. 1-7).

Masala, E. et al., "MAC-Level Partial Checksum for H.264 Video Transmission Over 802.11 Ad Hoc Wireless Networks," Proceedings of the IEEE 61st Vehicular Technology Conference (VTC 2005), May 2005, pp. 2864-2868, vol. 5, No. 30, IEEE, United States.

Supplementary European Search Report and Search Opinion dated Apr. 1, 2010 for European Patent Application No. 07745691.1-2223, pp. 1-11, European Patent Office, Munich, Germany.

International Preliminary Report on Patentability dated Sep. 30, 2008 for International Application No. PCT/KR2007/001528 filed Mar. 29, 2007, pp. 1-7, Korean Intellectual Property Office, Seo-gu, Daejeon, Republic of Korea.

Wu, Y. et al., "A Vacation Model with Setup and Close-Down Times for Transmitter Buffer of ARQ Schemes," Proceedings of the IEEE 14th International Symposium on Personal, Indoor and Mobile Radio Communications (PIMRC 2003), Sep. 2003, pp. 2054-2058, vol. 3, IEEE, United States.

Shao, H. et al., "Spatial Pixel Partitioning and Encoding Mechanisms for Uncompressed HD Video Over Wireless," U.S. Appl. No. 60/773,826, filed Feb. 15, 2006, 7 p., United States.

European Office Action dated Jul. 27, 2010 for European Patent Application No. 07745691.1-2223, p. 1, European Patent Office, Munich, Germany.

LG Electronics, Inc., "WirelessHD Specification Version 1.0 Overview," Oct. 9, 2007, pp. 1-77, United States.

PHYSorg.com, "NEC Develops Compact Millimeter-Wave Transceiver for Uncompressed HDTV Signal Transmission," PHYSorg.com, Apr. 1, 2005, pp. 1-2, United States, downloaded from http://www.physorg.com/news3569.html on Sep. 29, 2006.

Hachman, M., "CE Giants back Amimon's Wireless HDTV Tech," PCMAG.com, Jul. 23, 2008, p. 1, United States.

FreshNews.com, "SiBEAM Receives Equity Investment from Best Buy," FreshNews.com, Jan. 4, 2010, pp. 1-2, United States, downloaded from http://freshnews.com/print/node/261440 on Feb. 2, 2010.

Geri, N., "Wireless Uncompressed HDTV Solves Problems that Compression Cannot," Embedded.com, May 7, 2007, pp. 1-2, EE Times, United States.

Van Veen, B.D. et al., "Beamforming: A Versatile Approach to Spatial Filtering," IEEE ASSP Magazine, Apr. 1988, pp. 4-24, vol. 5, No. 2, IEEE, New York, NY, United States.

Maruhashi, K. et al., "Wireless Uncompressed-HDTV-Signal; Transmission System Utilizing Compact 60-GHz-Band Transmitter and Receiver," 2005 IEEE MTT-S International Microwave Symposium Digest, Jun. 2005, pp. 1867-1870, IEEE, United States.

"IEEE 802.15.3™—2003,""IEEE Standard for Information Technology—Telecommunications and Information Exchange between Systems—Local and Metropolitan Area Networks—Specific Requirements Part 15.3: Wireless Medium Access Control (MAC) and Physical Layer (PHY) Specifications for High Rate Wireless Personal Area Networks (WPANs)," LAN/MAN Standards Committee of the IEEE Computer Society, Sep. 2003, pp. 1-324, IEEE, United States.

U.S. Non-Final Office Action for U.S. Appl. No. 11/728,002 mailed Nov. 18, 2010.

U.S. Notice of Allowance for U.S. Appl. No. 11/728,002 mailed Mar. 15, 2011.

U.S. Non-Final Office Action for U.S. Appl. No. 11/945,962 mailed Jul. 5, 2011.

European Office Action dated Sep. 6, 2011 for European Patent Application No. 07745691.1-2223, pp. 1-6, European Patent Office, Munich, Germany.

Chinese Office Action dated Sep. 15, 2011 for Chinese Patent Application No. 200780052243.8, pp. 1-3, The State Intellectual Property Office of P.R. China, Beijing, China (English-language translation attached, 5 pp.).

Mexican Notice of Allowance dated Aug. 1, 2011 for Mexican Patent Application No. MX/a/2008/012469, pp. 1-4, Mexican Patent Office, Distrito Federal, Mexico.

Notification of Transmittal of the International Search Authority, Written Opinion for International Application No. PCT/KR2007/002438 dated Dec. 18, 2007.

Japanese Final Office Action dated Feb. 28, 2012 for Japanese Application No. JP 2009502677, pp. 1-5, Japan Patent Office, Tokyo, Japan (Machine-generated English-language translation attached, pp. 1-2).

U.S. Notice of Allowance for U.S. Appl. No. 11/945,962 mailed Feb. 23, 2012.

Caetano, L., "SiBEAM—60 GHz Architecture for Wireless Video Display," SiBEAM, Inc., Mar. 2006, pp. 1-6, White Paper, United States.

Chinese Office Action dated Sep. 15, 2011 for Chinese Patent Application No. 200780052243.8, pp. 1-3, The State Intellectual Property Office of P.R. China, Beijing, China (English-language translation attached, pp. 1-5).

Mexican Notice of Allowance dated Aug. 1, 2011 for Mexican Patent Application No. MX/a/2008/012469, p. 1, Mexican Patent Office, Distrito Federal, Mexico (Machine-generated English-language translation attached, pp. 1-2).

U.S. Final Office Action for U.S. Appl. No. 11/945,962 mailed Nov. 14, 2011.

U.S. Notice of Allowance for U.S. Appl. No. 11/906,193 mailed Jun. 24, 2010.

U.S. Final Office Action for U.S. Appl. No. 11/906,193 mailed Mar. 5, 2010.

U.S. Non-Final Office Action for U.S. Appl. No. 11/906,193 mailed Sep. 1, 2009.

U.S. Non-Final Office Action for U.S. Appl. No. 11/728,009 mailed Mar. 4, 2010.

Japanese Office Action dated Mar. 19, 2012 for Japanese Application No. JP 200955431, pp. 1-5, Japan Patent Office, Tokyo, Japan (Machine-generated English-language translation attached, pp. 1-3).

Chinese Office Action dated Aug. 6, 2012 for International Application No. 200780052243.8 from China Patent Office, pp. 1-10, People's Republic of China (English-language translation included, pp. 1-5).

* cited by examiner

METHOD AND SYSTEM FOR TRANSMISSION OF UNCOMPRESSED VIDEO OVER WIRELESS COMMUNICATION CHANNELS

RELATED APPLICATION

This application claims priority from U.S. Provisional Patent Application Ser. No. 60/785,771, filed on Mar. 24, 2006, incorporated herein by reference.

FIELD OF THE INVENTION

The present invention relates to wireless transmission, an in particular to wireless transmission of uncompressed video.

BACKGROUND OF THE INVENTION

With the proliferation of high quality video, an increasing number of electronic devices (e.g., consumer electronic devices) utilize high-definition (HD) video which can require about 1 gigabits per second (Gbps) in bandwidth for transmission. As such, when transmitting such HD video between devices, conventional transmission approaches compress the HD video to a fraction of its size to lower the required transmission bandwidth. The compressed video is then decompressed for consumption. However, with each compression and subsequent decompression of the video data, some data can be lost and the picture quality can be reduced.

The High-Definition Multimedia Interface (HDMI) specification allows transfer of uncompressed HD signals between devices via a cable. While consumer electronics makers are beginning to offer HDMI-compatible equipment, there is not yet a suitable wireless (e.g., radio frequency) technology that is capable of transmitting uncompressed HD video signals. Wireless local area network (WLAN) and similar technologies can suffer interference issues when several devices are connected which do not have the bandwidth to carry the uncompressed HD signal, and do not provide an air interface to transmit uncompressed video over 60 GHz band. There is, therefore, a need for a method and system for wireless transmission of uncompressed video without degrading picture quality.

BRIEF SUMMARY OF THE INVENTION

A method and system is provided for transmission of video information pixels over wireless channels, where each video pixel includes a plurality of components and each component comprises video information bits. The information bits are logically grouped into multiple logical groups in a packet, and error detection information such as multiple cyclic redundancy checks (CRCs) is determined for each logical group. The error detection information is placed in the packet, and the packet is transmitted from a transmitter to a receiver over a wireless channel.

In one embodiment, a transmitter groups the bits of uncompressed video pixel components into multiple logical groups per packet. Then, the transmitter determines a CRC value for each logical group, and places a CRC value in a CRC field in the packet for transmission to a receiver. The receiver uses the included CRC values to perform CRC calculations for detecting errors, and sends back an ACK frame to the transmitter to indicate which logical groups in the received packet are successfully received and which are erroneous. Based on the ACK frame from the receiver, the transmitter selectively retransmits a correct copy of the corrupted data to the receiver.

Logically grouping the information bits into multiple logical groups comprises logically grouping N information bits $B_0, \ldots, B_{N-1}$ per pixel component (ranging from a MSB $B_{N-1}$ to a LSB $B_0$ in terms of perceptual importance), into K logical groups $LG_0, \ldots, LG_{K-1}$, wherein $K \leq N$. In one case wherein $K<N$, then one or more information bits are placed in at least one logical group according to perceptual importance. In another case where $K<N$, then two or more information bits are placed in at least one logical group according to perceptual importance.

Upon receiving the packet the receiver uses the included CRC values to perform the CRC calculations for detecting errors. The receiver then sends back an acknowledgment (ACK) frame to the transmitter to indicate which logical groups in the received packet are successfully received and which are erroneous (i.e., corrupted). The receiver uses a bitmap of K bits in the ACK frame to indicate to the transmitter which logical groups are successfully received and which are erroneous. The size of the bitmap, which is the same as the number of logical groups, is negotiated between the transmitter and the receiver before the start of an uncompressed video stream transmission.

Based on the ACK frame from the receiver, the transmitter invokes selective retransmission of the correct copy of the corrupted logical groups to the receiver. In one embodiment, the transmitter invokes selective retransmission of the corrupted data by immediate retransmission of the corrupted data to the receiver in a retransmission packet. In another embodiment, the transmitter invokes delayed retransmissions of the corrupted data, wherein the transmitter first receives and collects P corresponding ACK frames back from the receiver. Then, based on the collected ACK frames, the transmitter determines the logical groups in the last P packets that need retransmissions. Then the transmitter begins a retransmission phase by retransmitting the corrupted logical groups from the highest priority logical group in perceptual importance, and continues until it can retransmit other logical groups in order of priority, without violating the receiver's presentation deadline.

These and other features, aspects and advantages of the present invention will become understood with reference to the following description, appended claims and accompanying figures.

BRIEF DESCRIPTION OF THE DRAWINGS

In the drawings, like references refer to like elements.

DETAILED DESCRIPTION OF THE INVENTION

The present invention provides a method and system for transmission, and selective retransmission, of uncompressed video over wireless communication channels. Typically, a video frame of pixels is divided into multiple scan lines. Each scan line contains an integer number of pixels, which are denoted by a number of pixel components. Quantization for pixel depth, or bits per pixel component (bitplane), may be 8-bit, 10-bit, 12-bit, or 16-bit values. A pixel component contains either a color component (chrominance) or a luminance component of the video. Considering an 8-bit quantization and 60 frames/second, a one second long uncompressed video (1080p) segment can be expressed as 60×3×8×1420×1080=2.98 gigabits. Typically, it is not possible to retransmit the entire stream from a transmitter to a receiver without violating the presentation deadline of a sink device such as a TV display.

As such, the present invention allows selective retransmission of video data based on human perceptual importance of such data. Given a frame of video pixels, wherein each pixel comprises multiple components (e.g., R, G, B), different bits of each pixel component do not equally affect the video quality. For example, a MSB largely affects the uncompressed video quality compared to a LSB. Therefore, in case of retransmission, the MSBs should be given the highest retransmission preference to conserve bandwidth and reduce retransmission delay.

In many wireless communication systems, a frame structure is used for data transmission between a transmitter and a receiver. For example, the IEEE 802.11 standard uses frame aggregation in a Media Access Control (MAC) layer and a physical (PHY) layer. In a typical transmitter, a MAC layer receives a MAC Service Data Unit (MSDU) and attaches a MAC header thereto, in order to construct a MAC Protocol Data Unit (MPDU). The MAC header includes information such as a source address (SA) and a destination address (DA). The MPDU is a part of a physical (PHY) layer Service Data Unit (PSDU) and is transferred to a PHY layer in the transmitter to attach a PHY header (i.e., PHY preamble) thereto to construct a PHY Protocol Data Unit (PPDU). The PHY header includes parameters for determining a transmission scheme including a coding/modulation scheme.

Typically, the most reliable coding/modulation scheme is applied to a PHY signal field in the PHY header, and an additional CRC check is added to ensure this information is received correctly at the receiver. The MAC header and the payload data in the MSDU are usually treated equally and transmitted using the same coding/modulation scheme, which is less robust than that for the PHY signal field of the PHY header. Further, before transmission as a packet from a transmitter to a receiver, a preamble is attached to the PPDU, wherein the preamble can include channel estimation and synchronization information.

Figure 1A:
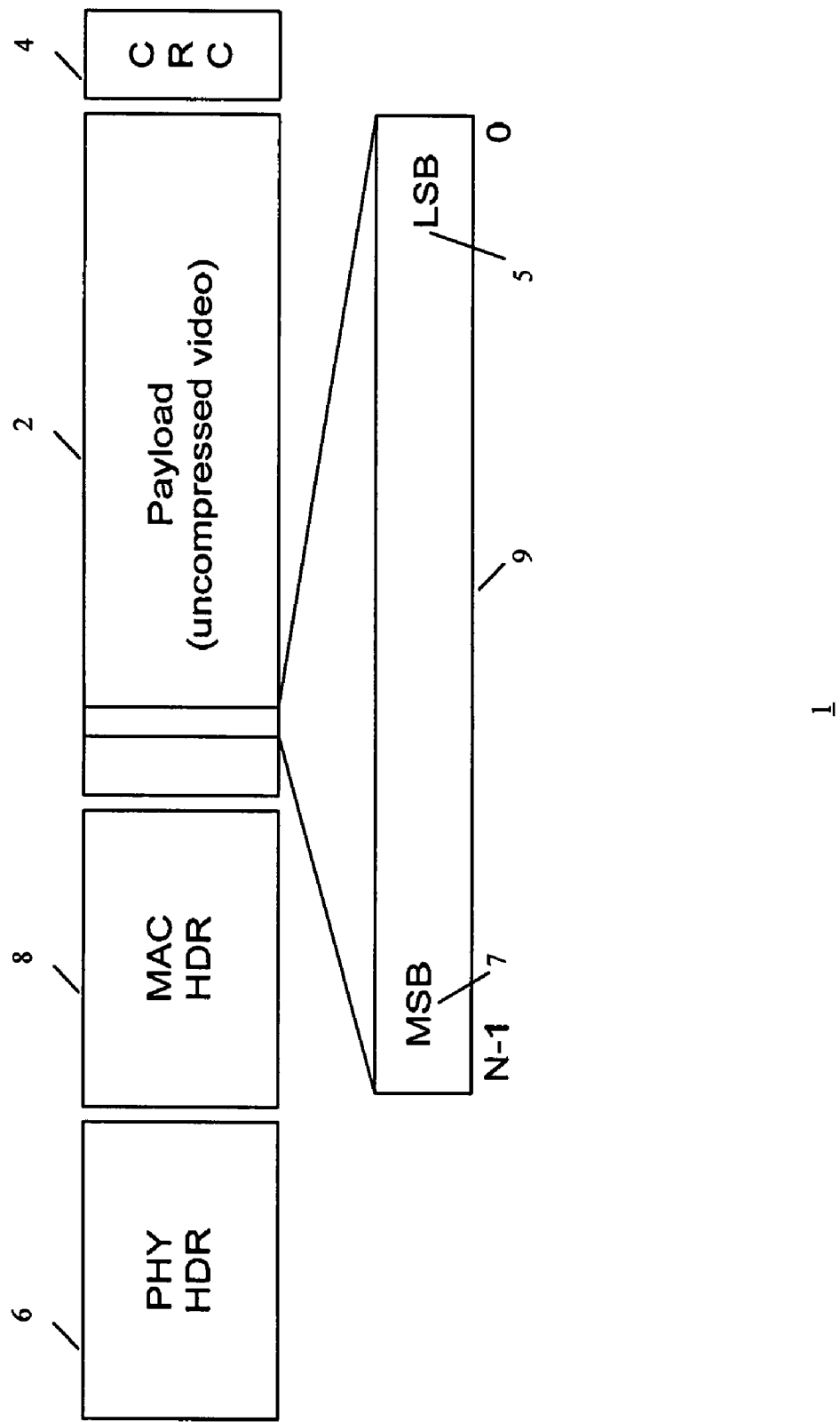
FIG. 1A shows an example of a data packet including a payload of uncompressed video pixel components that has a bit complemented in transmission from a transmitter to a receiver over a wireless channel.

FIG. 1A presents an example of a data packet 1 including a payload 2 of M uncompressed video pixel components that is transmitted from a transmitter to a receiver over a wireless channel. In addition to including the payload 2, the packet 1 includes a CRC value in a CRC field 4 for the video pixels, and the usual PHY layer header (PHY HDR) 6 and MAC layer header (MAC HDR) 8.

In one example, during transmission, a MSB 7 of an N-bit pixel component 9 in the payload 2 is complemented, causing a CRC error at the receiver. In another example, during transmission, a LSB 5 of an N-bit pixel component 9 in the payload 2 is complemented, causing a CRC error at the receiver. Since the CRC value comprises a checksum over the entire payload, it is not feasible to determine at the receiver whether the MSBs or the LSBs are corrupted. Moreover, retransmission of the payload when the LSB is complemented can be futile since a corrected LSB does not provide any discernible improvement to received video quality.

Figure 1B:
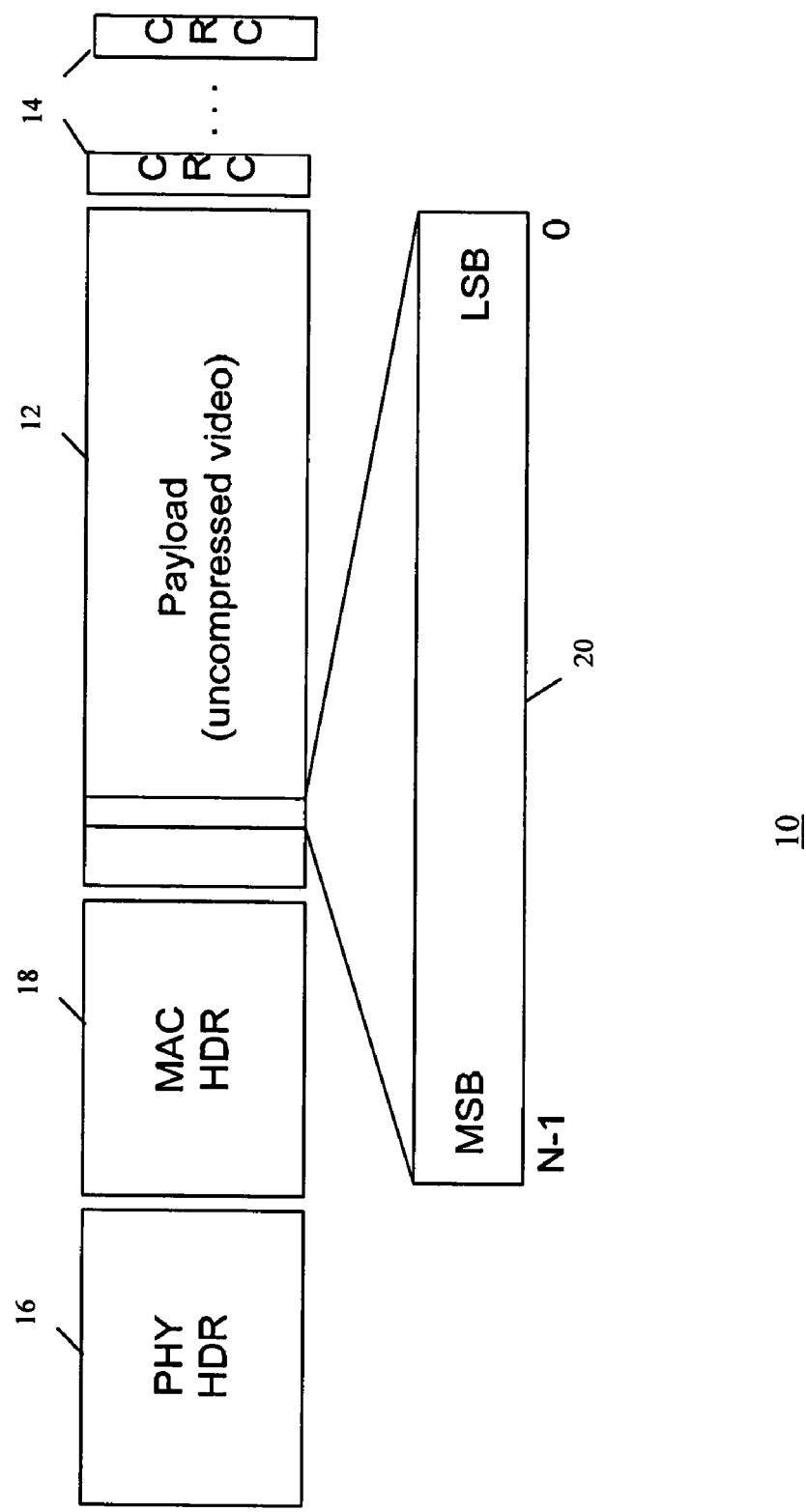
FIG. 1B shows an example data packet with a payload content as in FIG. 1A, however the payload comprises multiple logical groups and the packet includes a CRC field per logical group, according to the present invention.

FIG. 1B shows an example data packet 10, according to an embodiment of the present invention. The packet 10 includes a payload 12 of M uncompressed video pixel components that is transmitted from a transmitter to a receiver over a wireless channel. The payload 12 includes multiple logical groups (e.g., FIG. 5B) and the packet 10 further includes a CRC value per logical group. Each CRC value is placed in a corresponding CRC field 14. The packet 10 further includes a PHY HDR 16 and a MAC HDR 18. FIG. 1B further shows an N-bit pixel component 20.

Logically grouping the information bits into multiple logical groups comprises logically grouping N information bits $B_0, \ldots, B_{N-1}$ per pixel component (ranging from a MSB $B_{N-1}$ to a LSB $B_0$ in terms of perceptual importance), into K logical groups $LG_0, \ldots, LG_{K-1}$, wherein $K \leq N$. In one case wherein K<N, then one or more information bits are placed in at least one logical group according to perceptual importance. In another case where K<N, then two or more information bits are placed in at least one logical group according to perceptual importance. For example, N can be one of 8, 10, 12 or 16 bits per pixel component, and K=2 logical groups, wherein pixel component bits from a MSB $B_7$ to a bit $B_4$ are mapped to a first logical group $LG_1$, and pixel component bits from a bit $B_3$ to a LSB $B_0$ are mapped to second logical group $LG_0$.

In generating the packet 10, the transmitter (e.g., an uncompressed video stream source/sender) groups M×N video bits into K logical groups (K≦N) per packet 10, such that one or more bitplanes per pixel component are grouped in one logical group, where N is the number of bits per pixel component. If K equals N, then all of the LSBs are in a logical group, all of the MSBs are in another logical group, and so on and so forth. Then, the transmitter determines a CRC value for each logical group, and places the CRC value in a CRC field 14 in the packet 10.

In one example, the transmitter forms K=N logical groups in each packet, wherein each logical group has a CRC value that is placed in a corresponding CRC field in the packet. Thus, the transmitter places N CRC values in N CRC fields 14 in the packet 10, one for each pixel component bit logical group. The packet 10, including the CRC values, is transmitted to the receiver (e.g., an uncompressed video stream sink). Upon receiving the packet the receiver uses the included CRC values to perform the CRC calculations for detecting errors. The receiver then sends back an ACK frame to the transmitter to indicate which logical groups in the received packet are successfully received and which are erroneous (i.e., corrupted). Based on the ACK frame from the receiver, the transmitter invokes selective retransmission of the corrupted data to the receiver, as described in more detail further below.

Figure 2:
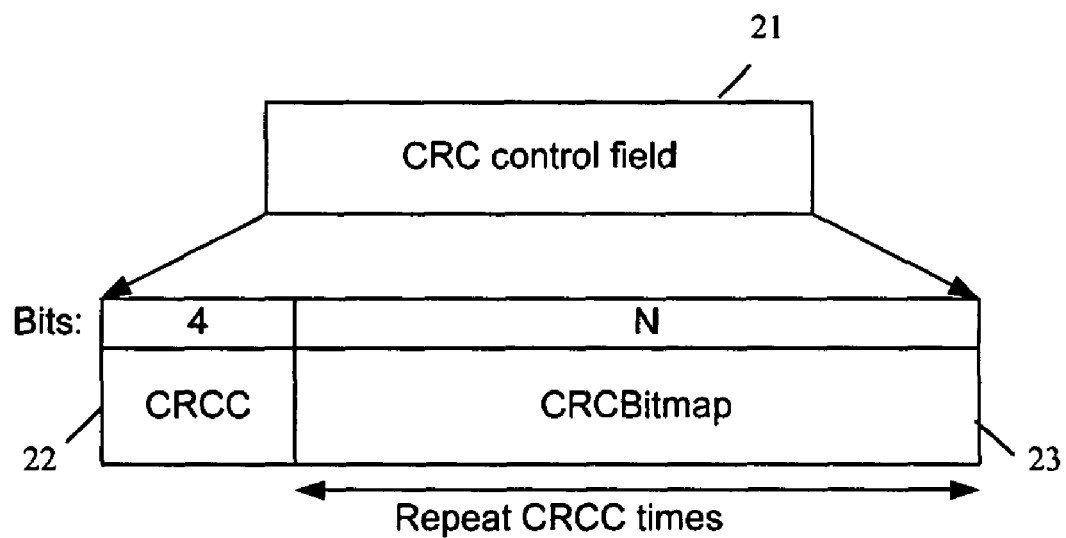
FIG. 2 shows an example CRC control field in the Media Access Control (MAC) header of the data packet of FIG. 1B, according to the present invention.

Referring to the example in FIG. 2, preferably the transmitter places a CRC control field 21 in the MAC HDR 18 to signal the receiver on how the logical groups are formed for CRC error detection at the receiver. The CRC control field 21 includes a CRC count (CRCC) field 22 that indicates the number of logical groups K formed in the packet. In this example, the CRCC field 22 is 4 bits long. The CRC control field 21 further includes a CRCBitmap field 23, which is repeated CRCC times, or the number of logical groups K formed. Assuming N bitplanes per pixel component (a typical value for N is 8, 10, 12 or 16), an array of N bits is used in the CRCBitmap field. The MSB of the CRCBitmap corresponds to the MSB bitplane. The zero entries in the CRCBitmap identify bitplanes that are excluded from the logical group, and thus, excluded from the CRC computation. Non-zero entries identify bitplanes that are included in the logical group, and thus, included in the CRC computation. Each possible bitplane combination may be selected. The CRCBitmap is repeated CRCC times (i.e., the field 23 is CRCC×N-bits long), which indicates the number of logical bitplane combinations formed.

Figure 3:
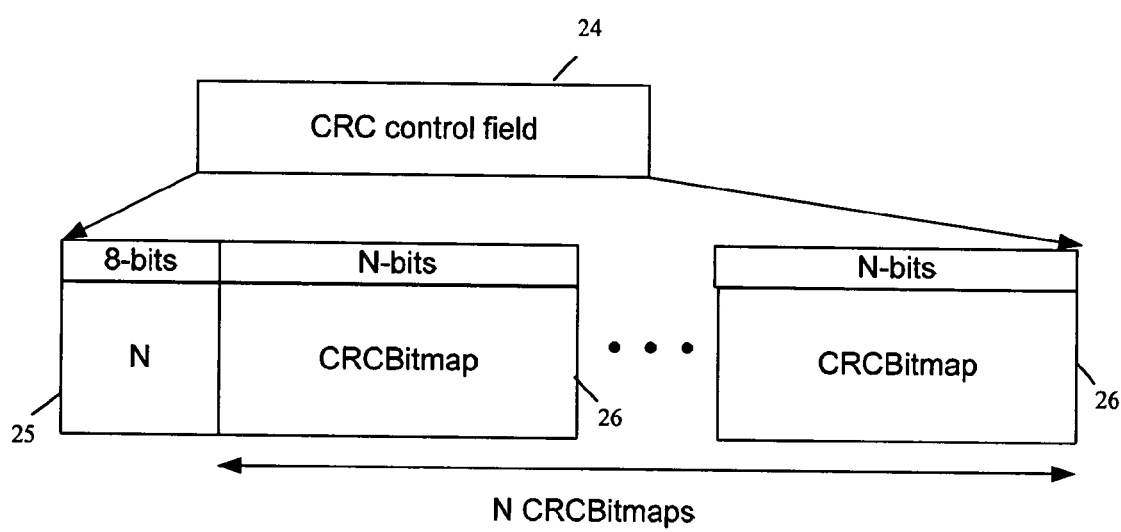
FIG. 3 shows a CRC control field indicating N logical groups, according to an embodiment of the present invention.

FIG. 3 illustrates another example CRC control field 24 including an 8-bit CRCC field 25, and N CRCBitmaps 26, wherein each CRCBitmap 26 comprises N bits. As each pixel component contains N bitplanes, the transmitter forms K N logical groups for a packet and for each logical group a CRC value is computed and placed in a corresponding CRC field in the packet. Thus, the CRCC field 25 is set to K=N. In each of the N CRCBitmaps 26 only one bit is set to "1" to indicate which bitplane is included in the CRC computation.

Figure 4:
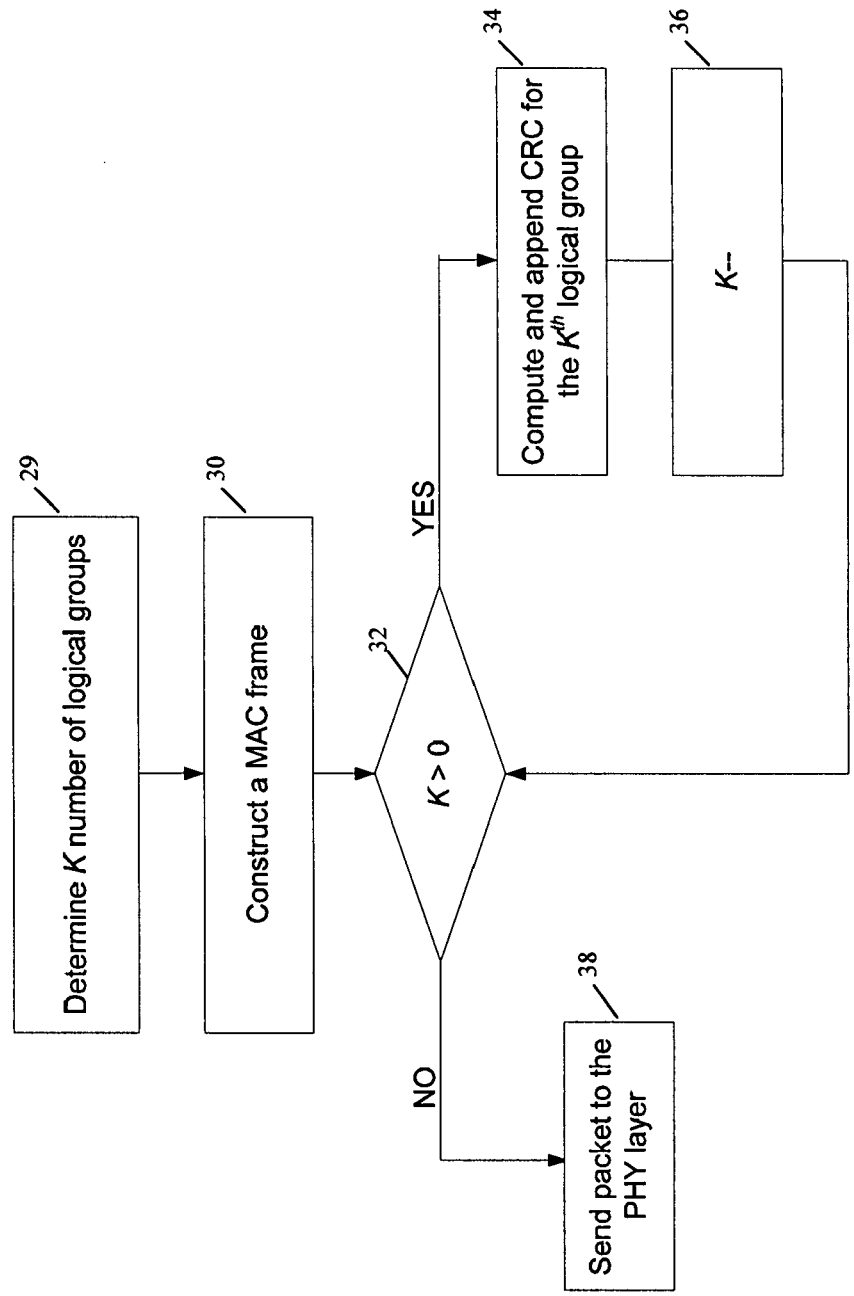
FIG. 4 shows a flowchart of a process for determining multiple CRC values for a data packet, according to an embodiment of the present invention.

FIG. 4 shows a flowchart of an embodiment of a process 28 for determining multiple CRC values for a packet, including the steps of:

Step 29: Determine the number of logical groups K.
Step 30: Construct a packet MAC frame containing video pixels as payload.
Step 32: Determine if K>0? If yes, then go to step 34, otherwise go to step 38.
Step 34: Compute and append a CRC value for the $K^{th}$ logical group, in the packet.
Step 36: Decrement K (e.g., by one), and go back to step 32.
Step 38: Send the packet to the PHY layer for transmission to the receiver.

Figure 5:
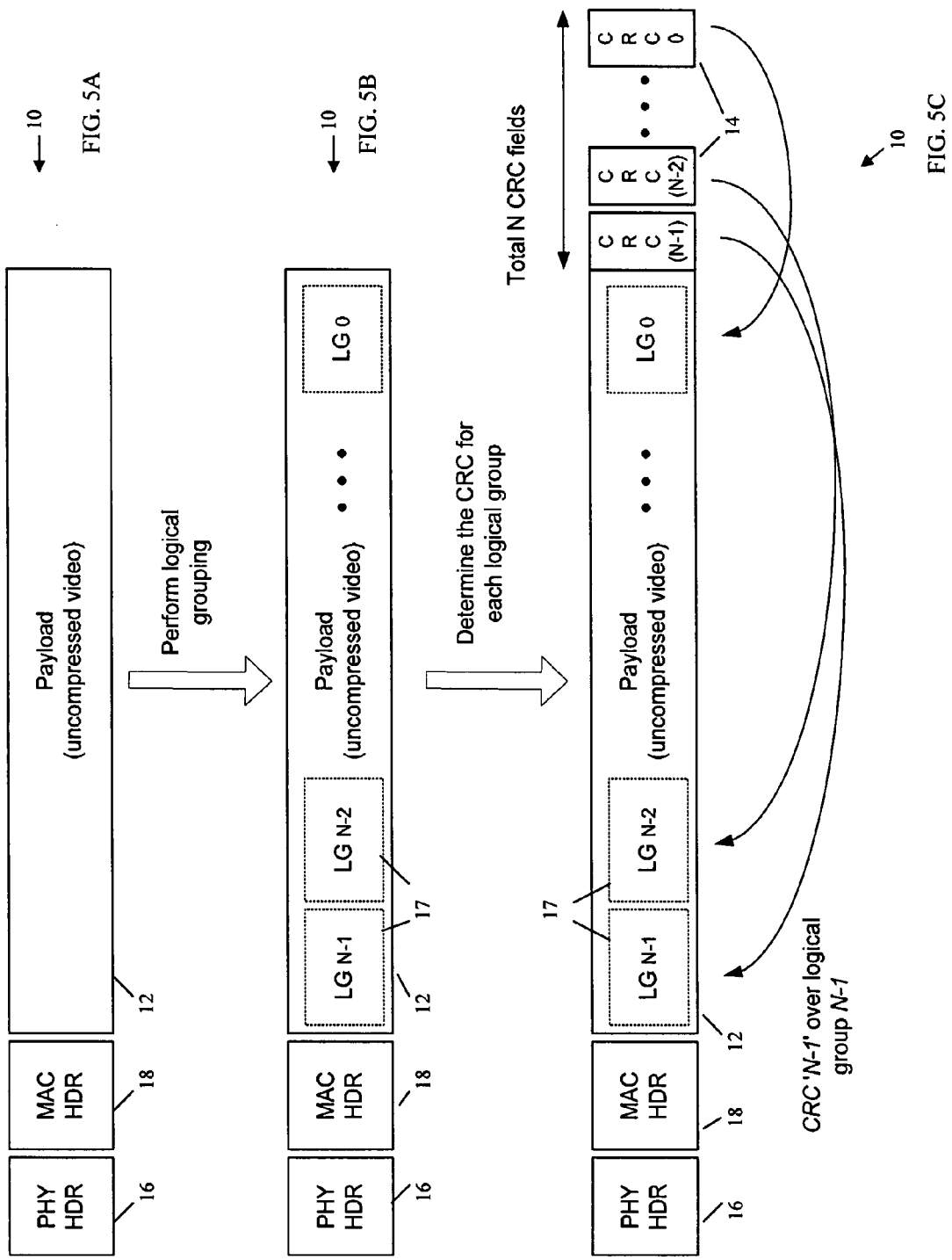
FIGS. 5A-C illustrate a diagrammatical example of forming N logical groups in a data packet based on the process of FIG. 4, wherein a CRC value is computed over each logical group, according to the present invention.

FIGS. 5A-C illustrates a diagrammatical example of forming K=N logical groups, $LG_0, \ldots, LG_{N-1}$, in a packet based on the steps in FIG. 4, wherein a CRC value is computed over each logical group. FIG. 5A shows said packet 10 including the uncompressed video payload 12, the PHY HDR 16 and the MAC HDR 18. FIG. 5B shows the packet 10 after the transmitter forms K=N logical groups 17 in the uncompressed video payload 12. For logical grouping, there is no physical/actual reordering/moving of various bits of the uncompressed video payload. The logical grouping is used for determining a CRC value for bits in each logical group.

FIG. 5C shows the packet 10 after the transmitter determines a CRC value for each logical group, and appends N CRC fields 14 to the packet 10, such that a CRC "N−1" is computed over a logical group "N−1", and so on. Thus, we have a total of N CRCs from $CRC_0$ to $CRC_{N-1}$.

Figure 6:
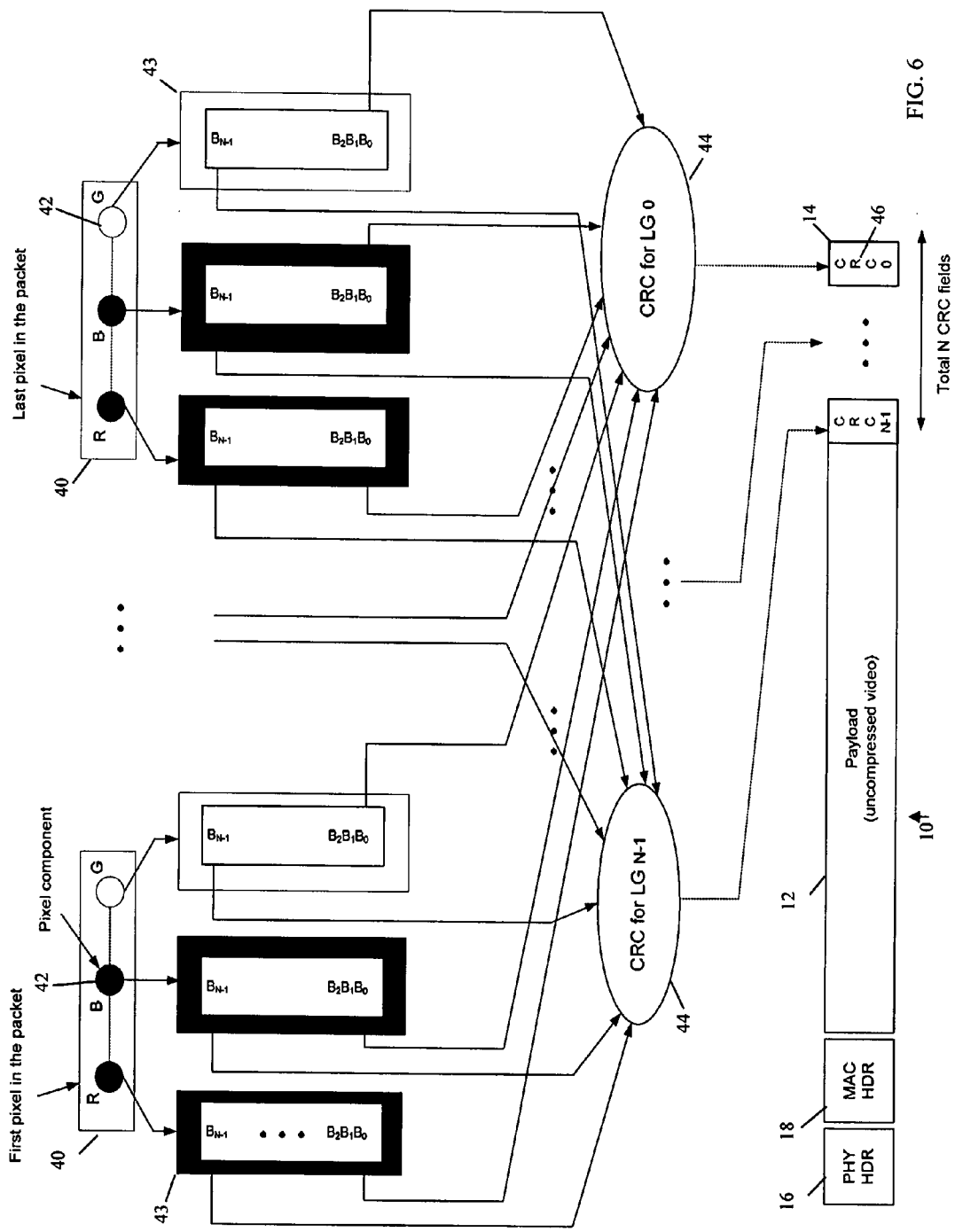
FIG. 6 exemplifies how the CRC values can be computed for different logical groups, according to an embodiment of the present invention.

FIG. 6 exemplifies how CRC values can be computed for different logical groups. In FIG. 6, a set of pixels 40 in the packet are shown, wherein each pixel includes three components 42 (e.g., R, G, B color components). Each pixel component includes N bits 43 (i.e., $B_0, \ldots, B_{N-1}$). The bits of the same level (or bitplane) for each pixel component 42, of all the pixels in the packet, form a logical group. For example, the bitplane $B_i$ of each pixel component 42, for all the pixels 40 in the packet, form a logical group i, wherein i=0, ..., N−1. As a result, in the example of FIG. 6 there are K=N logical groups (i.e., $LG_0, \ldots, LG_{N-1}$).

A CRC value 46 is calculated for each logical group using a corresponding calculation block 44, whereby in the example of FIG. 6 a total of N CRC values (i.e., $CRC_0, CRC_{N-1}$) are calculated. The N CRC values are placed in CRC fields 14 in the packet 10, wherein each CRC value 46 is placed in a corresponding CRC field 14.

When Unequal Error Protection (UEP) is applied, the transmitter uses similar coding rate for CRC values as for corresponding data (e.g., the same coding rate for data and corresponding CRC value).

The packet 10 with the CRC control field 21 and the CRC values in the CRC fields 14 are transmitted to the receiver (an uncompressed video stream sink). Upon receiving the packet, the receiver uses the CRC control field 21 and the CRC values to perform CRC calculations for detecting errors.

The receiver then sends an ACK frame to the transmitter to indicate the logical groups that are successfully received and those which are erroneous (i.e., corrupted). The receiver uses a bitmap of N bits in the ACK frame to indicate to the transmitter which logical groups are successfully received and which are erroneous. The size of the bitmap is negotiated between the transmitter and the receiver before the start of an uncompressed video stream transmission. The receiver uses a fixed length bitmap in the ACK frame to indicate the CRC errors. In another example, the number of ACK bits is less than the CRCBitmaps (or CRCC filed) which indicate the number of CRCs included. In this case, the receiver uses the CRC fields for performing error concealment techniques in the absence of retransmissions.

Figure 7:
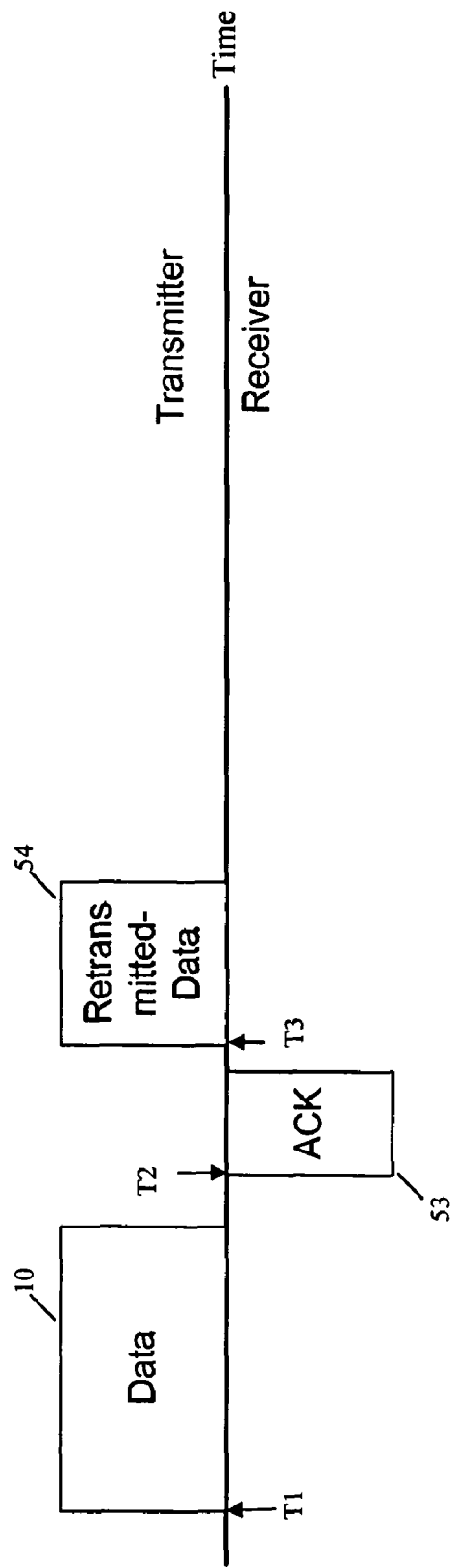
FIG. 7 shows an example timing diagram of selective retransmission of the corrupted data, according to the present invention.

Based on the ACK frame, in one example, the transmitter invokes selective retransmission of the corrupted uncompressed video data. FIG. 7 shows an example timing diagram wherein at time T1 the transmitter sends a packet 10 of uncompressed video pixel data (along with CRC fields and the CRC control field) to the receiver, and at time T2 the receiver sends back an ACK frame 53 to the transmitter, indicating the status of the received data packet. Upon receiving an ACK frame from the receiver, the transmitter essentially invokes immediate retransmission of the corrupted data in a retransmission packet 54 at time T3.

Figure 8:
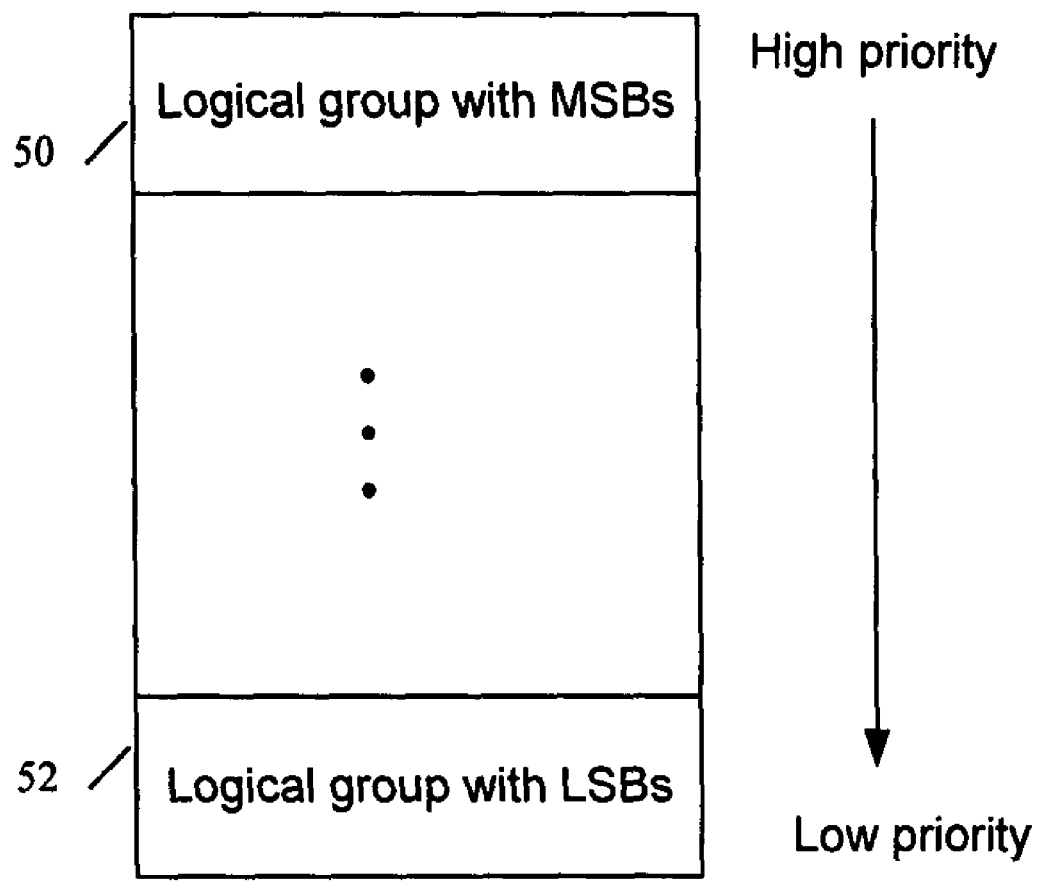
FIG. 8 shows the construction of a retransmission packet based on the perceptual importance of the logical groups, according to an embodiment of the present invention.

Since each packet has a specific presentation time at the receiver, the transmitter constructs the retransmission packet based on the perceptual importance of the logical groups as shown by the example in FIG. 8. As such in FIG. 8, a logical group 50 of pixel component MSBs has a higher retransmission priority than a logical group 52 of pixel component LSBs.

Figure 9:
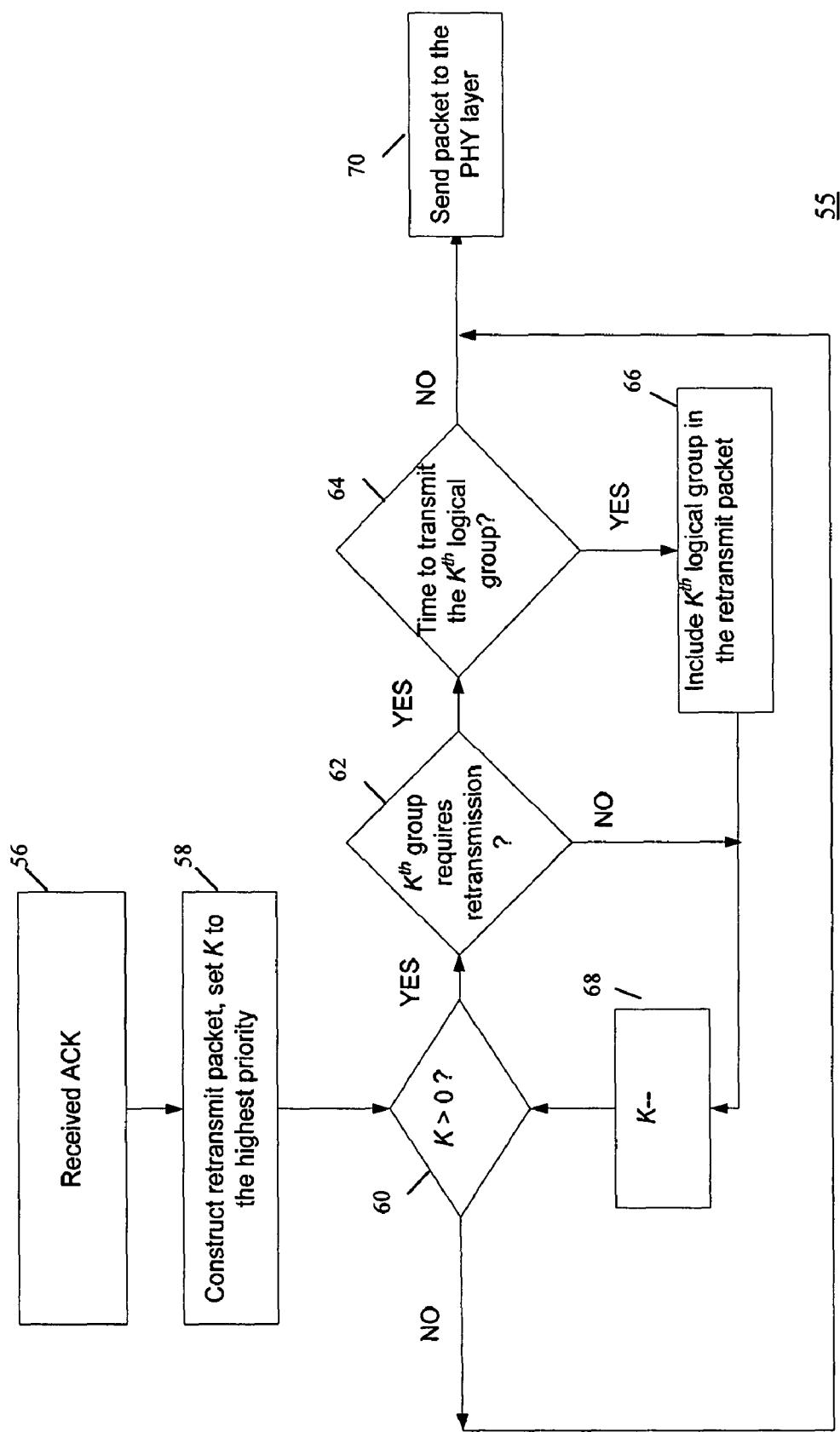
FIG. 9 shows a flowchart of an immediate retransmission process, according to an embodiment of the present invention.

FIG. 9 shows a flowchart of an embodiment of an immediate retransmission process 55 implemented by the transmitter after sending a packet to the receiver, including the steps of:

Step 56: Receive an ACK frame from the receiver.
Step 58: Construct an initial retransmit packet, and set an index K to indicate the highest priority (non zero).
Step 60: Determine if K>0? If not go to step 70, otherwise go to step 62.
Step 62: Based on the ACK frame, determine if the $K^{th}$ logical group in the last packet requires retransmission? If yes, go to step 64, otherwise go to step 68.
Step 64: Since each uncompressed video data packet has a fixed presentation deadline, determine if there is enough time to retransmit the $K^{th}$ logical group without exceeding the presentation deadline? If not, go to step 70, otherwise, go to step 66.
Step 66: Include the $K^{th}$ logical group in the retransmit packet.
Step 68: Decrement K (e.g., by one), and go back to step 60.
Step 70: Send a retransmit packet to the PHY layer for transmission to the receiver.

Figure 10:
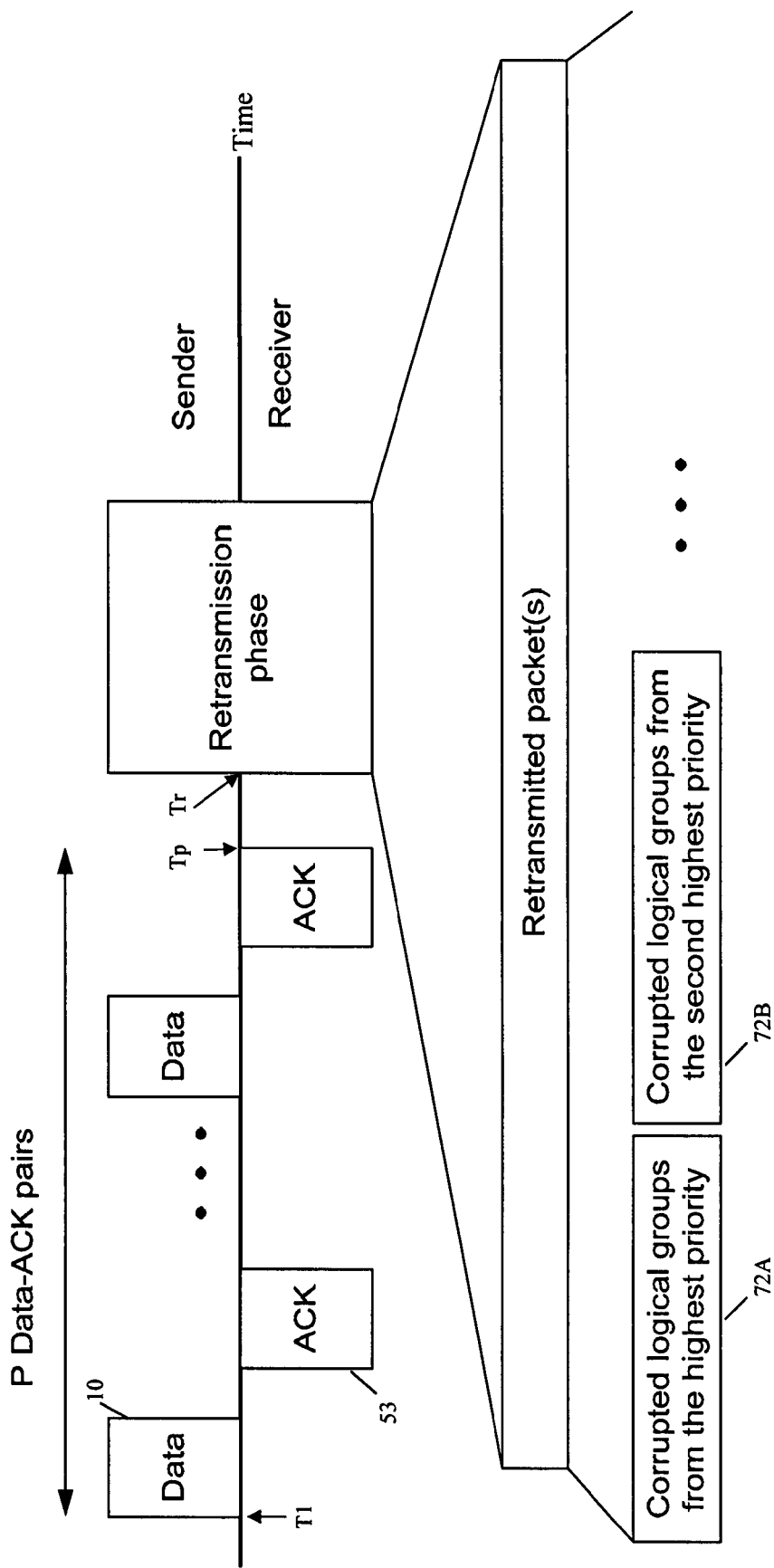
FIG. 10 shows an example timing diagram of a delayed retransmission method, according to the present invention.

In another example, the transmitter invokes delayed retransmissions of corrupted data. FIG. 10 shows a timing diagram for a delayed retransmission process, wherein in the time period between T1 and Tp (collection phase), the transmitter sends P packets 10 of video pixel data with CRC fields to the receiver, and receives P corresponding ACK frames 53 back from the receiver. As such, the transmitter collects P ACK frames 53.

Based on the collected ACK frames, the transmitter determines the logical groups in the last P packets that need retransmissions. Then at time Tr, the transmitter begins a retransmission phase by retransmitting the corrupted logical groups (72A, 72B, etc.) from the highest priority logical group in perceptual importance, and continues until it can retransmit other logical groups in order of priority, without violating the receiver's presentation deadline.

The transmitter includes the necessary signaling information in retransmissions so that the receiver can determine which logical groups are retransmitted and to which uncompressed video data packets they belong to. Assuming N bits per pixel component and retransmission after P packets and CRCC the number of CRC's per packet, at most CRCC×N×P bits are needed to signal the presence/absence of each logical group in said retransmissions.

Figure 11:
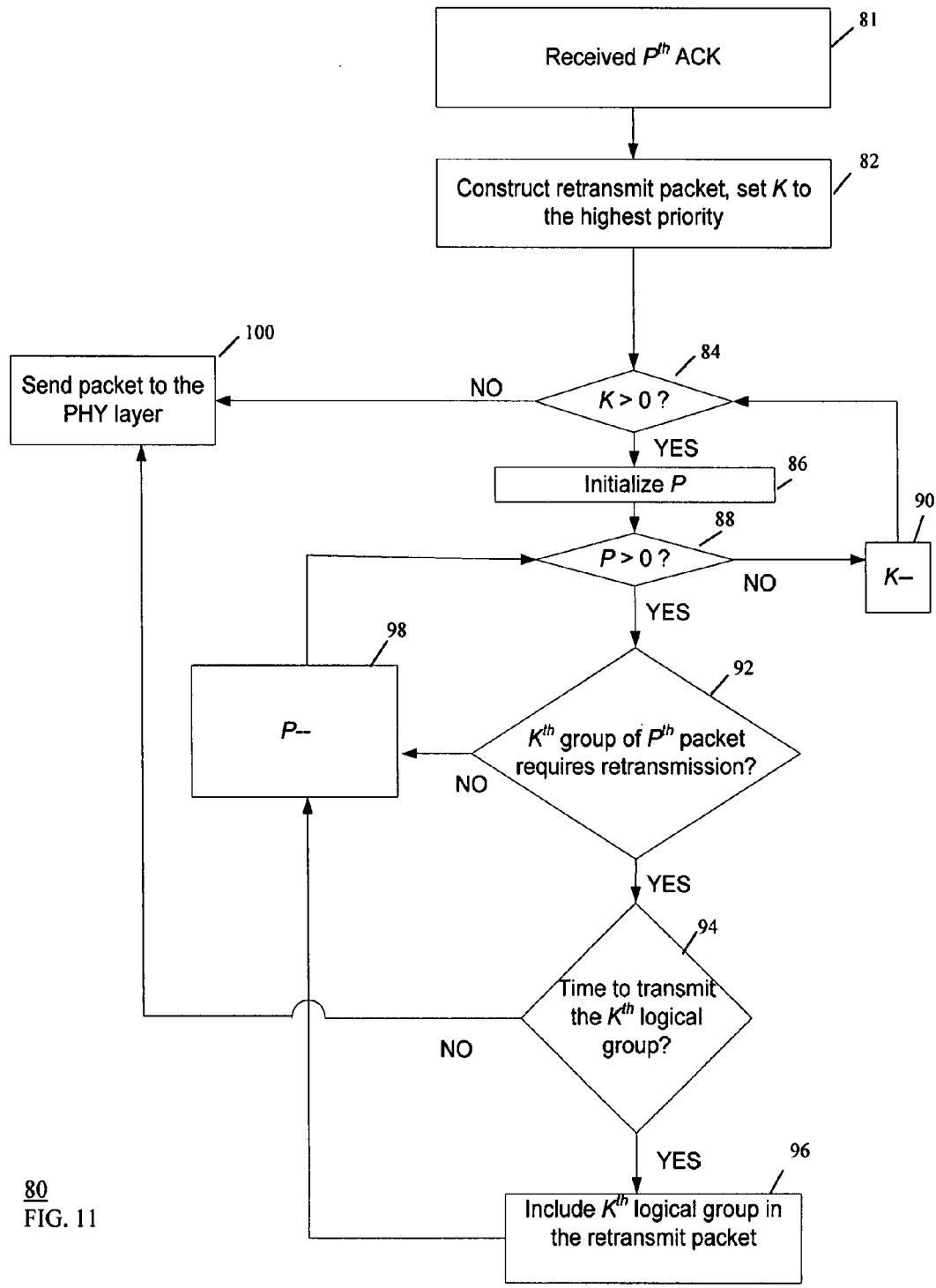
FIG. 11 shows a flowchart of a delayed retransmission process, according to an embodiment of the present invention.

FIG. 11 shows a flowchart of an embodiment of a delayed retransmission process 80 implemented by the transmitter after sending P packets to the receiver, including the steps of:
Step 81: Receive the $P^{th}$ ACK frame from the receiver.
Step 82: Construct an initial retransmit packet, and set an index K to indicate the highest priority (non zero).
Step 84: Determine if K>0? If not go to step 100, otherwise go to step 86.
Step 86: Initialize variable P to indicate P packets.
Step 88: Determine if P>0? If not go to step 90, otherwise go to step 92.
Step 90: Decrement K (e.g., by one). Go back to step 84.
Step 92: Based on the ACK frame, determine if the $K^{th}$ logical group of $P^{th}$ packet requires retransmission? If yes, go to step 94, otherwise go to step 98.
Step 94: Since each uncompressed video data packet has a fixed presentation deadline, determine if there is enough time to transmit the $K^{th}$ logical group? If not, go to step 100, otherwise, go to step 96.
Step 96: Include the $K^{th}$ logical group in the retransmit packet.
Step 98: Decrement P (e.g., by one), and go back to step 88.
Step 100: Send the retransmit packet to the PHY layer for transmission to the receiver.

In another example, the transmitter and the receiver negotiate a CRC control field by exchanging management or control frames. As a result, a CRC control field need not be in the MAC header. Whenever, either the transmitter or the receiver desires to change the CRC control field, another set of control or management frames are exchanged to successfully negotiate the new values of CRC control field.

Figure 12:
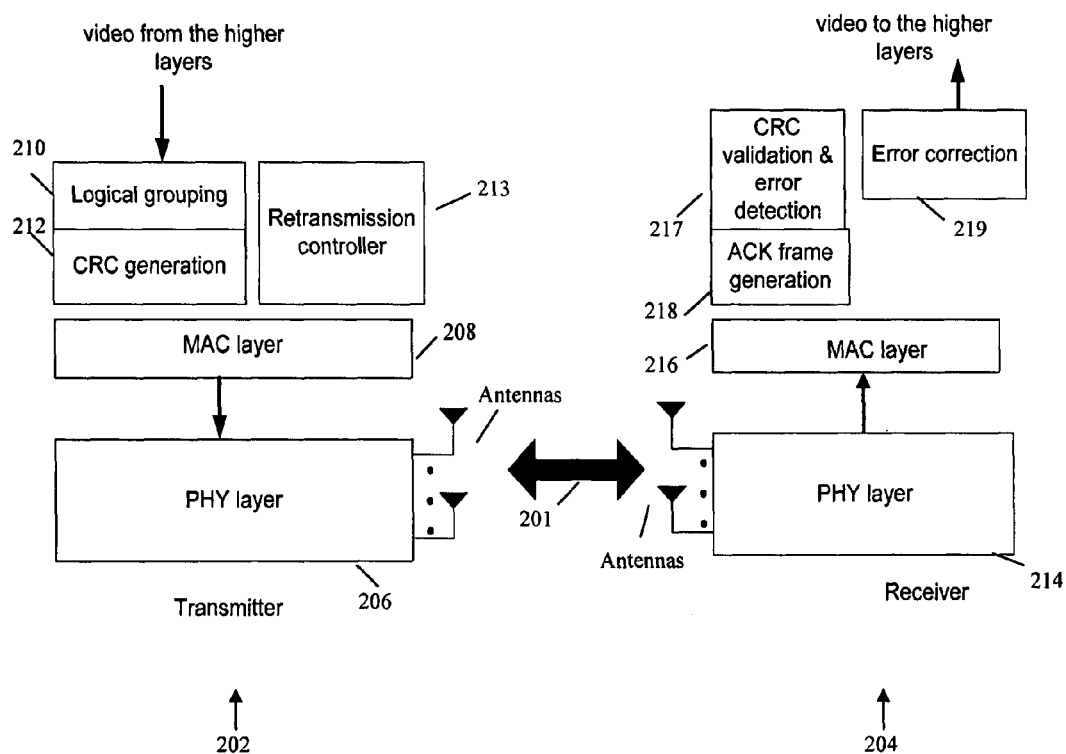
FIG. 12 shows a functional block diagram of an example communication system, according to the present invention.

FIG. 12 shows a functional block diagram of an example wireless communication system 200 according to the present invention, that implements selective retransmission of uncompressed video over wireless communication channels using multiple CRCs as described above. The system 200 includes a wireless transmitter 202 and a wireless receiver 204. The transmitter 202 includes a PHY layer 206 and a MAC layer 208. Similarly, the receiver 204 includes a PHY layer 214 and a MAC layer 216. The PHY and MAC layers provide wireless communication between the transmitter 202 and the receiver 204 via antennas through a wireless medium 201.

The transmitter 202 further includes a logical grouping module 210 that receives uncompressed video from higher levels (e.g., a video source such as a HDVD player) implements logical grouping on uncompressed video from higher levels according to the present invention. The transmitter 202 further includes a CRC generation module 212 that generates said CRC control field and CRC values according to the present invention. The logically grouped pixels along with the CRC control field and CRC values are placed in packets by the MAC layer 208, and transmitted by the PHY layer 206. The transmitter 202 further includes a retransmission controller 213 that implements the retransmission of corrupted data.

In the wireless receiver 204, the PHY and MAC layers 214 and 216, process the received packets. The receiver 204 further includes a CRC validation and error detection module 217 that uses the CRC control field and CRC values per packet to validate the CRC value and detect errors in the packet accordingly. The receiver 204 further includes an ACK frame generation module 218 that in conjunction with the MAC layer generates said ACK frames to indicate to the transmitter which logical groups in a packet are corrupted. The receiver 204 further includes an error correction module 219 that receives retransmitted logical groups from the transmitter and provides corrected uncompressed video pixels to higher layers for consumption (e.g., display). The error correction module 219 can also perform error concealment techniques in the absence of retransmissions.

Though in FIG. 12, modules 217, 218 and 214 in the receiver 204 are shown separate from the MAC layers 216, one or more of the modules 217, 218 and 214 can be a component of the MAC layer 216. Similarly, one or more of the modules 210, 212 and 213 in the transmitter can be a component of the MAC layer 208.

Figure 13:
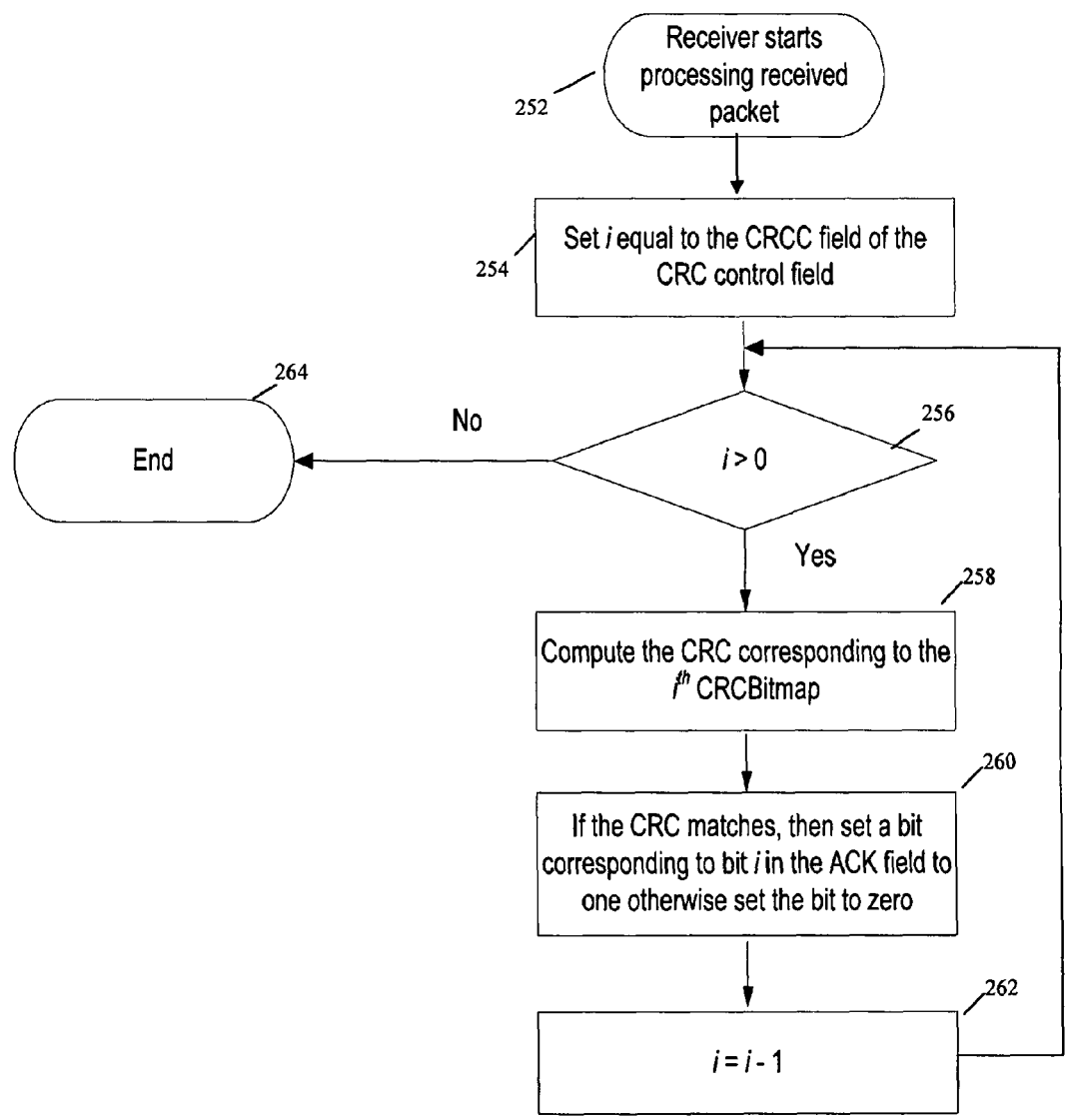
FIG. 13 shows a flowchart of an example process implemented by the receiver to perform the CRC calculations for detecting errors, according to the present invention.

FIG. 13 shows a flowchart of an example process 250 implemented by the receiver to perform the CRC calculations for detecting errors. The packet 10 with the CRC control field 21 and the CRC values in the CRC fields 14 are transmitted to the receiver. Upon receiving the packet, the receiver uses the CRC control field 21 and the CRC values, to perform the CRC calculations for detecting errors, according to the following steps:
Step 252: Receive the packet and begin processing the packet.
Step 254: Set index i equal to the CRCC field of the CRC control field in the packet.
Step 256: Determine if i>0. If yes, go to step 258, otherwise go to step 264.

Step 258: Compute the CRC corresponding to the $i^{th}$ CRCBitmap.

Step 260: If the CRC matches, then set a bit corresponding to bit i in the ACK field to one otherwise set the bit to zero Step 262: i=i−1, go back to step 256.

Step 264: End.

In one example, the ACK frame indicates the corrupted information for the highest priority logical groups according to perceptual importance, to the transmitter. The lowest priority logical groups, according to the perceptual importance are determined if they are correctly received by the receiver based on the CRC calculations, whereby an error concealment technique is used in the absence of retransmissions. In another example, no ACK is sent by the receiver back to the transmitter, but CRC fields are included in the packet 20 so that the receiver can use some error concealment technique to recover bit errors.

Though in the above examples the CRC is used for error detection, those skilled is skilled in the art will recognize that the present invention is useful with other error detection/correction information from the correctness and optionally type of error can be recovered. Therefore, the present invention is not limited to CRC as error detection/correction means.

As is known to those skilled in the art, the aforementioned example architectures described above, according to the present invention, can be implemented in many ways, such as program instructions for execution by a processor, as logic circuits, as an application specific integrated circuit, as firmware, etc. The present invention has been described in considerable detail with reference to certain preferred versions thereof; however, other versions are possible. Therefore, the spirit and scope of the appended claims should not be limited to the description of the preferred versions contained herein.

What is claimed is:

1. A method for transmission of video information over a wireless channel, comprising:
   inputting video pixels, wherein each pixel includes a plurality of components and each component comprises video information bits;
   logically grouping the information bits into multiple logical groups in a packet based on the perceptual importance of the information bits;
   determining error detection information for each logical group;
   placing the error detection information in the packet, wherein placing the error detection information in the packet comprises placing the error detection information for each logical group in a corresponding error detection field in the packet; and
   transmitting the packet from a transmitter over a wireless channel to a receiver.

2. The method of claim 1 wherein determining error detection information for each logical group comprises determining a CRC value for the information bits in each logical group.

3. The method of claim 1 wherein the packet includes multiple error detection fields corresponding to the multiple logical groups.

4. The method of claim 1 wherein logically grouping the information bits into multiple logical groups comprises logically grouping the information bits into multiple logical groups in the packet based on the perceptual importance of the information bits.

5. The method of claim 4 wherein logically grouping the information bits into multiple logical groups comprises logically grouping N information bits $B_0, \ldots, B_{N-1}$ per pixel component, into K logical groups $LG_0, \ldots, LG_{K-1}$, such that information bits with related perceptual importance are grouped in the same logical group.

6. The method of claim 5 wherein the information bits with the same perceptual importance are grouped in the same logical group.

7. The method of claim 5 wherein the MSBs of the information bits are grouped in one logical group and the LSBs of the information bits are grouped in another logical group.

8. The method of claim 4 wherein each pixel component comprises N bits, such that logically grouping the information bits into multiple logical groups comprises logically grouping the information bits into K logical groups such that the information bits with the same perceptual importance are grouped in the same logical group.

9. The method of claim 4 wherein each pixel component comprises N bits ranging from a MSB to a LSB in terms of perceptual importance, such that logically grouping the information bits into multiple logical groups comprises logically grouping the information bits into K logical groups, wherein the information bits with the same perceptual importance are grouped in the same logical group.

10. The method of claim 9 wherein each pixel component comprises N bits, $B_0, \ldots, B_{N-1}$, ranging from a MSB $B_{N-1}$ to a LSB $B_0$ in terms of perceptual importance, such that logically grouping the information bits into multiple logical groups comprises logically grouping the information bits into K logical groups $LG_0, \ldots, LG_{K-1}$, wherein K<N, such that one or more bits of a pixel component are mapped to one logical group.

11. The method of claim 10 wherein N can be one of 8, 10, 12 or 16 bits per pixel component, and K=2 logical groups, wherein pixel component bits from a MSB $B_{N-1}$ to a bit $B_{N/2}$ are mapped to a first logical group $LG_1$, and pixel component bits from a bit $B_{N/2-1}$ to a LSB $B_0$ are mapped to second logical group $LG_1$.

12. The method of claim 10 wherein K=N such that the bits $B_{N-1}$ for all pixels in the packet are grouped in logical group $LG_{N-1}$, the bits $B_{N-2}$ for all pixels in the packet are grouped in logical group $LG_{N-2}$, and so on.

13. The method of claim 10 wherein one or more logical groups are protected against channel errors with modulation and coding that according to the perceptual importance of each logical group.

14. The method of claim 13 wherein determining error detection information for each logical group comprises determining a CRC (Cyclic Redundancy Check) value for the information bits in each logical group.

15. The method of claim 14 wherein coding and modulation for a CRC field match those for the corresponding logical group.

16. The method of claim 14 further comprising placing a CRC control field in a MAC header of the packet to signal the receiver how the logical groups are formed for CRC error detection at the receiver.

17. The method of claim 16 wherein the CRC control field includes:
   a CRC count (CRCC) field that indicates the number of logical groups formed in the packet, and a CRCBitmap field which is repeated CRCC times or the number of logical groups formed.

18. The method of claim 17 further including negotiating a CCRC control field between the transmitter and the receiver before commencing transmission of packets.

19. The method of claim 18 further including using an array of N bits in the CRCBitmap field for N bitplanes per pixel component.

20. The method of claim 19 wherein the MSB of the CRCBitmap corresponds to the MSB bitplane, and zero array entries in the CRCBitmap identify bitplanes that are excluded from the logical group, and thus, excluded from the CRC computation.

21. The method of claim 20 wherein non-zero array entries identify bitplanes that are included in the logical group, and thus, included in the CRC computation.

22. The method of claim 1 further comprising:
receiving the packet at the receiver;
based on the CRC values determining the corrupted packet information;
generating an ACK frame to indicate the corrupted information to the transmitter; and
transmitting the ACK frame back to the transmitter.

23. The method of claim 22 further comprising:
receiving an ACK frame at the transmitter;
based on the ACK frame, generating a retransmit packet including information bits that are indicated as corrupted in the last packet by the ACK frame; and
selectively retransmitting the bits corresponding to the corrupted logical groups to the receiver.

24. The method of claim 23 wherein generating a retransmit packet comprises generating a retransmit packet including information bits that are indicated as corrupted in the last packet by the ACK frame, based on human perceptual importance of such data.

25. The method of claim 23 further comprising:
receiving P ACK frames at the transmitter;
based on the P ACK frames, determining the logical groups in the last P packets that need retransmissions;
retransmitting a correct copy of the information bits in the corrupted logical groups from a high priority logical group in perceptual importance, and continuing the retransmitting of other corrupted logical groups in order of priority, without violating the receiver's presentation deadline.

26. The method of claim 25 further comprising:
placing a CRC control field in a MAC header of each packet to signal to the receiver how the logical groups are formed for CRC error detection at the receiver, the CRC control field including a CRC count (CRCC) field that indicates the number of logical groups formed in the packet, and a CRCBitmap field which is repeated CRCC times or the number of logical groups formed;
wherein the number of ACK bits is less than or equal to the CRC Count (CRCC) which indicate the number of CRCs, the method further including the receiver using the CRC fields for performing error concealment in the absence of retransmissions.

27. The method of claim 26, further comprising generating an ACK frame to indicate the corrupted information for the highest priority logical groups according to perceptual importance.

28. The method of claim 27 further including, based on CRC calculations, determining if the lowest priority logical groups according to perceptual importance are correctly received by the receiver, and performing error concealment for the lowest priority logical groups received corrupt at the receiver, in the absence of retransmissions.

29. The method of claim 1 further comprising:
receiving a packet at the receiver; and
based on the CRC values, determining the corrupted packet information and performing error concealment to recover the bit errors.

30. The method of claim 1 further comprising selectively retransmitting to the receiver, bits corresponding to logical groups corrupted in transmission.

31. A wireless system for transmission of uncompressed video information including pixels, each pixel including a plurality of components and each component including video information bits, the system comprising:
a wireless transmitter; and
a wireless receiver;
wherein the wireless transmitter includes:
a logical grouping module configured to logically group the information bits into multiple logical groups in a packet;
an error detection information generating module configured to generate error detection information for each logical group in the packet, wherein the error detection information generating module is configured to place the error detection information for each logical group in a corresponding error detection field in the packet; and
a communication module configured to transmit the packet with the error detection information over a wireless channel to the receiver.

32. The system of claim 31 wherein an error detection information generating module is configured to determine error detection information for each logical group by determining a CRC value for the information bits in each logical group.

33. The system of claim 30 wherein the packet includes multiple error detection fields corresponding to the multiple logical groups.

34. The system of claim 32 wherein the logical grouping module is configured to logically group the information bits into multiple logical groups in the packet based on the perceptual importance of the information bits.

35. The system of claim 34 wherein the information bits with related perceptual importance are grouped in the same logical group.

36. The system of claim 35 wherein the information bits with the same perceptual importance are grouped in the same logical group.

37. The system of claim 35 wherein the MSBs of the information bits are grouped in one logical group and the LSBs of the information bits are grouped in another logical group.

38. The system of claim 34 wherein each pixel component comprises N bits and the logical grouping module is configured to logically group the information bits into K logical groups such that the information bits with the same perceptual importance are grouped in the same logical group.

39. The system of claim 34 wherein each pixel component comprises N bits ranging from a MSB to a LSB in terms of perceptual importance, and the logical grouping module is configured to logically group the information bits into K logical groups wherein the information bits with the same perceptual importance are grouped in the same logical group.

40. The system of claim 39 wherein each pixel component comprises N bits, $B_0, \ldots, B_{N-1}$, ranging from a MSB $B_{N-1}$ to a LSB $B_0$ in terms of perceptual importance, and the logical grouping module is configured to logically group the information bits into K logical groups $LG_0, \ldots, LG_{K-1}$, wherein K<N, such that one or more bits of a pixel component are mapped to one logical group.

41. The system of claim 39 wherein N can be one of 8, 10, 12 or 16 bits per pixel component, and K=2 logical groups, wherein pixel component bits from a MSB $B_{N-1}$ to a bit $B_{N/2}$ are mapped to a first logical group $LG_1$, and pixel component bits from a bit $B_{N/2-1}$ to a LSB $B_0$ are mapped to second logical group $LG_1$.

42. The system of claim 40 wherein K=N such that the bits $B_{N-1}$ for all pixels in the packet are grouped in logical group $LG_{N-1}$, the bits $B_{N-2}$ for all pixels in the packet are grouped in logical group $LG_{N-2}$, and so on.

43. The system of claim 39 wherein one or more logical groups are protected against channel errors with modulation and coding that according to the perceptual importance of each logical group.

44. The system of claim 40 wherein the an error detection information generating module is configured to determine error detection information for each logical group by determining a CRC (Cyclic Redundancy Check) value for the information bits in each logical group.

45. The system of claim 44 wherein coding and modulation used for a CRC field match those used for the corresponding logical group.

46. The system of claim 44 wherein the communication module is further configured to place a CRC control field in a MAC header of the packet to signal the receiver how the logical groups are formed for CRC error detection at the receiver.

47. The system of claim 46 wherein the CRC control field includes:
a CRC count (CRCC) field that indicates the number of logical groups formed in the packet, and a CRCBitmap field which is repeated CRCC times or the number of logical groups formed.

48. The system of claim 47 wherein a CCRC control field is negotiated between the transmitter and the receiver before commencing transmission of packets.

49. The system of claim 47 wherein the CRCBitmap field includes an array of N bits for N bitplanes, per pixel component.

50. The system of claim 47 wherein the MSB of the CRCBitmap corresponds to the MSB bitplane, and zero array entries in the CRCBitmap identify bitplanes that are excluded from the logical group, and thus, excluded from the CRC computation.

51. The system of claim 50 wherein non-zero array entries identify bitplanes that are included in the logical group, and thus, included in the CRC computation.

52. The system of claim 31 wherein the receiver includes:
a communication module configured to receiver packets over a wireless channel;
an error detection module configured to determine corrupted packet information based on the CRC values in a received packet; and
an acknowledgement module configured to generate an ACK frame per packet to indicate the corrupted information to the transmitter;
wherein the communication module of the receiver transmits the ACK frame back to the transmitter.

53. The system of claim 52 wherein:
the communication module of the transmitter is configured to receive an ACK frame from the receiver;
the transmitter further includes a retransmission controller configured such that based on the ACK frame, the retransmission controller generates a retransmit packet including information bits corresponding to those indicated as corrupted in the last packet by the ACK frame; and
the communication module of the transmitter is further configured to selectively retransmit said corresponding bits to the receiver.

54. The system of claim 53 wherein the retransmission controller is configured to generate a retransmit packet including information bits corresponding to those indicated as corrupted in the last packet by the ACK frame, based on human perceptual importance of such data.

55. The system of claim 53 wherein:
the transmitter is configured to receive P ACK frames from the receiver;
the retransmit controller is configured such that based on the P ACK frames the retransmit controller determines the logical groups in that last P packets that need retransmissions; and
the retransmission controller is further configured to retransmit a correct copy of the information bits in the corrupted logical groups from a high priority logical group in perceptual importance, and continue retransmission of other corrupted logical groups in order of priority, without violating the receiver's presentation deadline.

56. The system of claim 55 wherein:
the an error detection information generating module is further configured to place a CRC control field in a MAC header of each packet to signal the receiver how the logical groups are formed for CRC error detection at the receiver, the CRC control field including a CRC count (CRCC) field that indicates the number of logical groups formed in the packet, and a CRCBitmap field which is repeated CRCC times or the number of logical groups formed; and
the number of ACK bits is less than or equal to the CRC Count (CRCC) which indicate the number of CRCs, and the error detection module of the receiver is configured to use CRC fields to perform error concealment in the absence of retransmissions.

57. The system of claim 56 wherein the acknowledgment module of the receiver is further configured to generate an ACK frame to indicate the corrupted information for the highest priority logical groups according to perceptual importance.

58. The system of claim 57 wherein the error detection module of the receiver is further configured such that based on the CRC calculations, the error detection module determines if the lowest priority logical groups according to perceptual importance, are correctly received by the receiver, and performs error concealment for the lowest priority logical groups received corrupt at the receiver, in the absence of retransmissions.

59. The system of claim 31 wherein the receiver includes:
a communication module configured to receive a packet at the receiver; and
an error detection module configured such that based on the CRC values in the packet, the error detection module determines the corrupted packet information, and performs error concealment to recover bit errors.

60. The system of claim 31 wherein the transmitter further includes a retransmission controller configured to selectively retransmit to the receiver, bits corresponding to logical groups corrupted in transmission.

61. A wireless transmitter for the transmission of video information including pixels, each pixel including a plurality of components and each component including video information bits, the transmitter comprising:
a logical grouping module configured to logically group the information bits into multiple logical groups in a packet;
a cyclic redundancy code (CRC) module configured to generate error detection information for each logical group in the packet, wherein an error detection information generating module is configured to place the error detection information for each logical group in a corresponding error detection field in the packet; and a communication module configured to transmit the packet with the error detection information over a wireless channel to a receiver.

62. The transmitter of claim 61 wherein the CRC an error detection information generating is configured to determine error detection information for each logical group by determining a CRC value for the information bits in each logical group.

63. The transmitter of claim 62 wherein the packet includes multiple error detection fields corresponding to the multiple logical groups.

64. The transmitter of claim 61 wherein the logical grouping module is configured to logically group the information bits into multiple logical groups in the packet based on the perceptual importance of the information bits.

65. The transmitter of claim 64 wherein N information bits $B_0, \ldots, B_{N-1}$ per pixel component are grouped into K logical groups $LG_0, \ldots, LG_{K-1}$, such that information bits with related perceptual importance are grouped in the same logical group.

66. The transmitter of claim 65 wherein the information bits with the same perceptual importance are grouped into the same logical group.

67. The transmitter of claim 65 wherein the MSBs of the information bits are grouped into one logical group and the LSBs of the information bits are grouped in another logical group.

68. The transmitter of claim 64 wherein each pixel component comprises N bits and the logical grouping module is configured to logically group the information bits into K logical groups such that the information bits with the same perceptual importance are grouped in the same logical group.

69. The transmitter of claim 64 wherein each pixel component comprises N bits ranging from a MSB to a LSB in terms of perceptual importance, and the logical grouping module is configured to logically group the information bits into K logical groups wherein the information bits with the same perceptual importance are grouped in the same logical group.

70. The transmitter of claim 69 wherein each pixel component comprises N bits, $B_0, \ldots, B_{N-1}$, ranging from a MSB $B_{N-1}$ to a LSB $B_0$ in terms of perceptual importance, and the logical grouping module is further configured to logically group the information bits into K logical groups $LG_0, \ldots, LG_{K-1}$, wherein K<N, such that one or more bits of a pixel component are mapped to one logical group.

71. The transmitter of claim 70 wherein N can be one of 8, 10, 12 or 16 bits per pixel component, and K=2 logical groups, wherein pixel component bits from a MSB $B_{N-1}$ to a bit $B_{N/2}$ are mapped to a first logical group $LG_1$, and pixel component bits from a bit $B_{N/2-1}$ to a LSB $B_0$ are mapped to second logical group $LG_1$.

72. The transmitter of claim 70 wherein K=N such that the bits $B_{N-1}$ for all pixels in the packet are grouped in logical group $LG_{N-1}$, the bits $B_{N-2}$ for all pixels in the packet are grouped in logical group $LG_{N-2}$, and so on.

73. The transmitter of claim 70 wherein one or more logical groups are protected against channel errors with modulation and coding that according to the perceptual importance of each logical group.

74. The transmitter of claim 70 wherein the CRC an error detection information generating is configured to determine error detection information for each logical group by determining a CRC (Cyclic Redundancy Check) value for the information bits in each logical group.

75. The transmitter of claim 74 wherein coding and modulation for a CRC field match those for the corresponding logical group.

76. The transmitter of claim 74 wherein the communication module is further configured to place a CRC control field in a MAC header of the packet to signal the receiver how the logical groups are formed for CRC error detection at the receiver.

77. The transmitter of claim 76 wherein the CRC control field includes:

a CRC count (CRCC) field that indicates the number of logical groups formed in the packet, and a CRCBitmap field which is repeated CRCC times or the number of logical groups formed.

78. The transmitter of claim 77 wherein the transmitter is configured to negotiate a CCRC control field with the receiver before commencing transmission of packets.

79. The transmitter of claim 77 wherein the CRCBitmap field includes an array of N bits for N bitplanes per pixel component.

80. The transmitter of claim 79 wherein the MSB of the CRCBitmap corresponds to the MSB bitplane, and zero array entries in the CRCBitmap identify bitplanes that are excluded from the logical group, and thus, excluded from the CRC computation.

81. The transmitter of claim 80 wherein non-zero array entries identify the bitplanes that are included in the logical group, and thus, included in the CRC computation.

82. The transmitter of claim 61 wherein:

the communication module of the transmitter is configured to receive an ACK frame per packet from the receiver, each ACK frame including indication of information bits received by the receiver in error;

the transmitter further includes a retransmission controller configured such that based on the ACK frame, the retransmission controller generates a retransmit packet including information bits corresponding to those indicated as corrupted in the last packet by the ACK frame; and the communication module of the transmitter is further configured to selectively retransmit said corresponding bits to the receiver.

83. The transmitter of claim 82 wherein the retransmission controller is configured to generate a retransmit packet including information bits corresponding to those indicated as corrupted in the last packet by the ACK frame, based on human perceptual importance of such data.

84. The transmitter of claim 82 wherein:

the transmitter is configured to receive P ACK frames from the receiver;

the retransmit controller is configured such that based on the P ACK frames, the retransmit controller determines the logical groups in that last P packets that need retransmissions; and the retransmission controller is further configured for retransmitting a correct copy of the information bits in the corrupted logical groups from a high priority logical group in perceptual importance, and continuing the retransmitting of other corrupted logical groups in order of priority, without violating the receiver's presentation deadline.

85. The transmitter of claim 61 further comprising a retransmission controller configured to selectively retransmit to the receiver, bits corresponding to logical groups corrupted in transmission.

86. A wireless receiver for receiving video information over a wireless channel, comprising:
- a communication module configured to receive packets of video information over a wireless channel, each packet including logically grouped video information bits and corresponding CRC (cyclic redundancy check) information for each logical group;
- an error detection module configured to determine corrupted packet information based on the CRC information in a received packet; and
- an acknowledgement module configured to generate an acknowledgement (ACK) frame per packet to indicate the corrupted information to a transmitter for retransmission of a correct copy of the information bits in the corrupted logical groups from a high priority logical group in perceptual importance;
- wherein the communication module of the receiver transmits the ACK frame back to the transmitter.

87. The receiver of claim 86 wherein the error detection module is further configured such that based on the CRC calculations, the error detection module determines if the highest priority logical groups according to perceptual importance, are correctly received by the receiver, and performs error concealment for the lowest priority logical groups received corrupt at the receiver, in the absence of retransmissions.

88. A method for transmission of video information over a wireless channel, comprising:
- inputting video pixels, wherein each pixel includes a plurality of components and each component comprises video information bits;
- logically grouping the information bits into multiple logical groups in a packet based on the perceptual importance of the information bits, wherein the information bits with a same perceptual importance are grouped in the same logical group;
- determining error detection information for each logical group;
- placing the error detection information in the packet, wherein placing the error detection information in the packet comprises placing the error detection information for each logical group in a corresponding error detection field in the packet; and
- transmitting the packet from a transmitter over a wireless channel to a receiver.

89. A wireless system for transmission of uncompressed video information including pixels, each pixel including a plurality of components and each component including video information bits, the system comprising:
- a wireless transmitter; and
- a wireless receiver;
- wherein the wireless transmitter includes:
  - a logical grouping module configured to logically group the information bits into multiple logical groups in a packet, wherein the information bits with related perceptual importance are grouped in the same logical group;
  - an error detection information generating module configured to generate error detection information for each logical group in the packet, wherein the error detection information generating module is configured to place the error detection information for each logical group in a corresponding error detection field in the packet; and
  - a communication module configured to transmit the packet with the error detection information over a wireless channel to the receiver.

* * * * *